Patented June 8, 1948

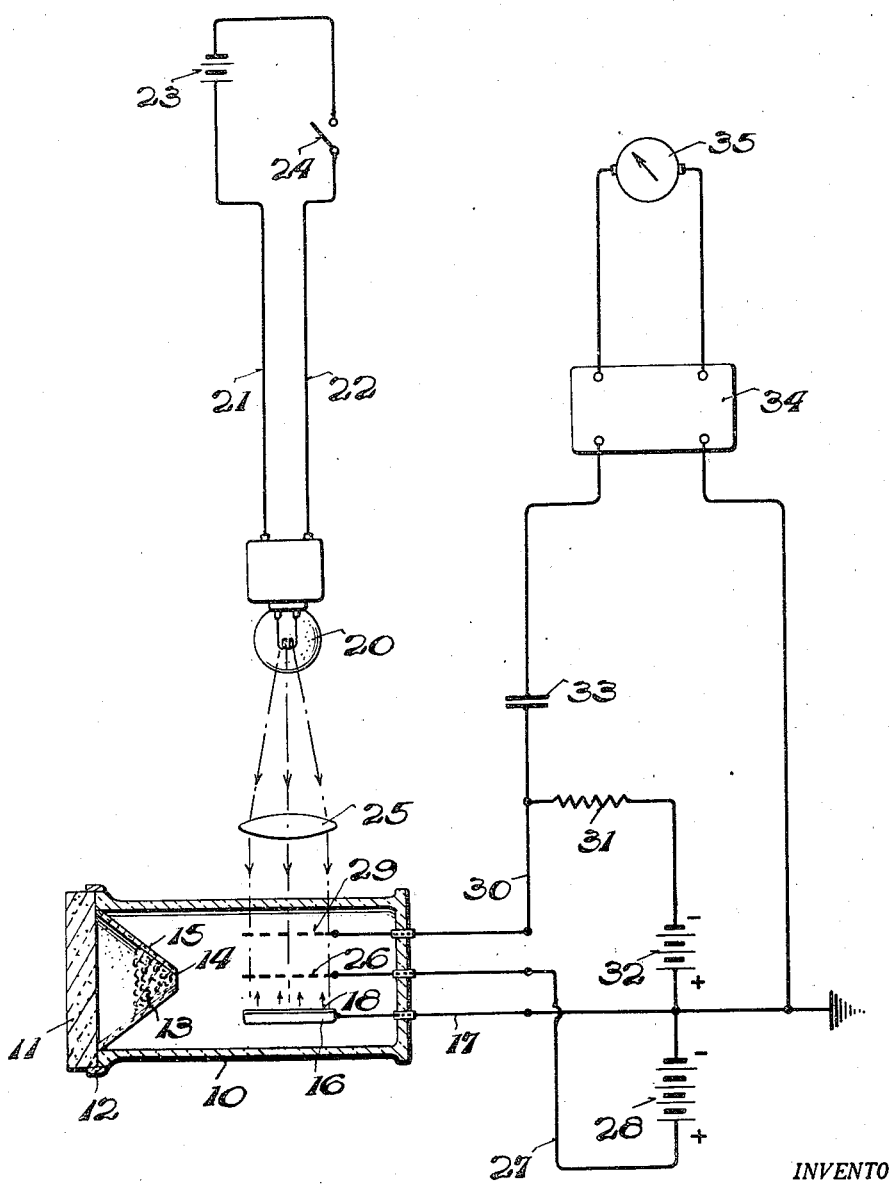

2,442,824

UNITED STATES PATENT OFFICE 2,442,824

RADIANT ENERGY RECEIVER

William R. Polye, River Edge, N. J., assignor to Bendix Aviation Corporation, Teterboro, N. J., a corporation of Delaware Application March 13, 1944, Serial No. 526,245

7 Claims. (Cl. 250—83.3)

This invention relates generally to radiant energy devices and more particularly to radiant energy receiver cells of the type utilizing a change in pressure, produced by a substance sensitive to radiant energy, the pressure change being transformed into an electrical change for energizing a suitable indicating or controlling circuit.

In copending application Serial No. 526,242, filed March 13, 1944, in which applicant is one of the co-inventors, it has been proposed to ionize the gases released by a radiant energy responsive substance by permitting the gases to pass between a filament and a grid element having a continuous electron flow therebetween. The ions resulting from the collision of the electrons and the gas are collected by the plate whereupon current flow ensues in the plate circuit thereby energizing the indicating or controlling circuit. Even though the detector of the copending application was designed to operate at low filament temperatures there was the possibility that after operating for a given length of time the surrounding atmosphere would become heated sufficiently to excite the radiant energy responsive substance whereupon some gas would be released to flow within the tube when, as a matter of fact, no rays of radiant energy exterior of the tube were being received by the substance.

The present invention constitutes an improvement over the above-described cell in that a cold cathode is provided for emitting electron flow to the grid element without heating the surrounding atmosphere so that any errors from this source have been thereby eliminated. The cathode in the present instance, is provided with a photo-electric or light sensitive surface which in response to rays of light transmitted from a suitable source, arranged inside or outside of the cell, will emit electrons to flow to a grid element.

An object of the present invention, therefore, is to provide a novel radiant energy receiver cell of the type adapted for transforming a pressure change created by a substance responsive to radiant energy into an electrical change.

Another object of the invention is to provide a novel radiant energy detector sensitive only to radiant energy emanating from a desired source and one which is substantially free of acceleration or temperature errors.

A further object of the invention is to provide a novel detector of the character described in which a cold cathode is utilized having a photoelectric or light sensitive surface whereby in response to light rays falling upon the surface the filament provides an electron flow to a grid element and notwithstanding the length of use of the detector the temperature of the cathode will remain substantially unchanged.

Another and further object is to provide a novel radiant energy receiver cell having an increased sensitivity to radiant energy waves emanating from any desired source and one in which a higher frequency response is obtained.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention.

The single figure of the drawing is a side elevation view in section of the novel radiant energy receiver cell of the present invention together with one form of an electrical detector circuit adapted for use therewith.

Referring now more particularly to the single figure of the drawing for a more detailed description of the present invention, the receiver cell is shown as comprising a body portion or tube 10, formed of glass or other suitable material, and having the front or open end thereof provided with a window 11 formed of some suitable material such as, rock salt, for example. Window 11 is sealably connected to the open end of the tube by means of a sealing compound 12 whereby the vacuum provided within the tube, the latter being initially evacuated, is readily maintained.

Mounted at the front end of tube 10 and immediately behind window 11 is a substantially conically shaped holder 13 provided with an aperture 14 at the apex thereof for communication with the interior of the body portion. Holder 13 contains a finely divided dark substance 15, such as carbonized vegetable fibres in the form of a fine fluff, which is adapted for releasing stored or adsorbed gases into the tube through aperture 14 in response to radiant energy acting thereon. The holder, moreover, is formed of suitable design and material so as to permit maximum exposure of substance 15 and is made porous or vented to thereby release adsorbed gases through the walls thereof as well as through aperture 14.

Coming now to the novel detector of the present invention, the latter is shown as comprising a cold cathode 16 arranged at the rear of tube 10 and grounded by means of a conductor 17. The cathode is, moreover, provided with a photoelectric or light sensitive surface 18 at one side thereof so that when light rays impinge upon the surface electrons are emitted by the cathode. Any suitable source of light may be provided for activating surface 18 and may, for example, take the form of a light bulb 20 connected by way of conductors 21 and 22 with a battery 23 and a switch 24. Furthermore, if desired, a focusing lens 25 may be interposed between bulb 20 and the light sensitive surface of the cathode to concentrate the light rays upon surface 18.

Surrounding cathode 16 is a grid element 26, preferably formed of mesh material to permit transmission therethrough of light rays from bulb 20 upon surface 18 of the cathode. Grid 26 is connected by means of a lead 27 with a battery 28 whereby current flows from the battery to the grid and to ground and back to the negative side of the battery. Associated with the grid element is a plate element 29 formed in the same manner as the grid to transmit light rays therethrough from bulb 20 on to surface 18 of the cathode. Plate 29 is connected by way of a lead 30 with a resistor 31 and to the negative side of a D. C. source such as battery 32. By virtue of such connection plate 29 is made negative with respect to grid 26, the current of the latter being substantially constant, so that electrons emitted by cathode 16 in response to light rays activating surface 18 flow to grid 26.

Plate element 29 is also connected through a condenser 33 with the input of a conventional tube amplifier 34, the output of which is fed to an indicating instrument 35. In place of instrument 35, however, the amplifier output may be fed to energize any suitable position or control device in accordance with radiant energy received by the cell.

Coming now to the operation of the novel cell of the present invention, it may be considered that switch 24 has been closed whereby bulb 20 is energized and transmits light rays therefrom through lens 25 to impinge upon and activate surface 18 of the cathode whereupon an electron stream flows from the cathode to the grid. When radiant energy waves fall upon substance 15 within holder 13, gases are released by the substance and flow to the rear of tube 10 where they pass between the cathode and the grid and are ionized due to collisions with the electrons flowing from the cathode to the grid. The ions so formed pass to and are collected by plate 29 whereby a current impulse is generated at the plate which passes through condenser 33 to amplifier 34.

As pointed out in the aforementioned copending application, the provision of condenser 33 at the plate output serves the novel function of blocking plate current which results from gradual changes in ambient temperature from passing to the amplifier. Due to the fact that gases will be released gradually by substance 15 as a result of a change in ambient temperature, the plate current developed will be substantially unidirectional and cannot pass through the condenser. As soon, however, as radiant energy falls upon substance 15, gases are released rapidly and, as a result, a pulsating current is generated at the plate which is passed by the condenser to the amplifier.

The advantages derived over the prior art devices by the novel cell of the present invention above described will now be apparent to those skilled in the art. For example, a cell of increased sensitivity is provided as well as one which affords higher frequency response than that heretofore available by reason of the fact that substance 15 may be operated at reduced gas pressures and also because of the elimination of all mechanical impedances heretofore present in known devices of this character.

Although but a single embodiment of the present invention has been illustrated and described in detail, it is to be expressly understood that the invention is not limited thereto. For example, window 11 may be completely eliminated and in its stead the tube 10 may be continued to form a complete enclosed envelope so that the front of the tube would act as the window in the manner shown in the aforementioned copending application. Various other changes may be made in the design and arrangement of the parts without departing from the spirit and scope of the invention, as will now be understood by those skilled in the art. For a definition of the limits of the invention, reference will be had primarily to the appended claims.

I claim:

1. Radiant energy receiving apparatus comprising a sealed container having means sensitive to rays emanating from a source of light for emitting electrons within said container, means comprising a gas-occluding substance responsive to radiant energy for causing gas to flow within said container for ionization by said electrons, and means comprising an electrical circuit having current flow developed therein in response to said ionized gas.

2. Radiant energy receiving apparatus comprising a sealed container having means sensitive to rays emanating from a source of light for emitting electrons within said container, a chamber within said container, means comprising a gas-occluding substance within said chamber responsive to radiant energy for causing gas to flow within said container for ionization by said electrons, and means comprising an electrical circuit having current flow developed therein in response to said ionized gas.

3. Radiant energy receiving apparatus comprising a sealed container having means provided with a light sensitive coating whereby in response to light rays emanating from a source exterior of said container said means provides a flow of electrons within said container, gas-occluding means responsive to radiant energy for causing gas to flow within said container for ionization by said electrons, and an electrical circuit having current flow developed therein in response to said ionized gas.

4. In combination with a vacuum tube having cathode, grid and plate elements, said cathode being provided with a light sensitive surface and responsive to a source of light rays for providing an electron flow between said cathode and said grid elements, and means within said tube comprising a gas-occluding substance responsive to radiant energy for causing gas to flow therein for ionization by said electrons whereby current flows at said plate element.

5. Radiant energy receiving apparatus comprising an evacuated container, a transparent window at one end of said container, a chamber adjacent said window and containing a gas-occluding substance therein, means comprising cathode, grid and plate elements at the other end of said container, said cathode being sensitive to light rays for causing an electron flow between said cathode and said grid elements, and an electrical circuit connected to said plate element, said gas-occluding means acting to release gas flow within said container whereby said gas is ionized by the electrons passing from said cathode to said grid element to thereby produce a current flow at said plate element.

6. In combination with a vacuum tube having cathode, grid and plate elements, said cathode being sensitive to light rays for causing an electron flow between said cathode and grid elements, gas-occluding means within said tube responsive to radiant energy for causing gas to flow therein for ionization by said electrons, and an electrical circuit having current flow developed therein in response to said ionized gas.

7. The combination with a vacuum tube having cathode, grid and plate elements, said cathode being light sensitive, of a source of light exterior of said tube for transmitting light rays to said cathode whereby said cathode provides a flow of electrons to said grid element, gas-occluding means within said tube responsive to radiant energy for causing gas to flow therein for ionization by said electrons, said ionized gas providing a current flow at said plate element.

WILLIAM R. POLYE.

REFERENCES CITED

The following references are of record in the file of this patent:

UNITED STATES PATENTS

| Number | Name | Date |
|---|---|---|
| 2,058,941 | Arnhym | Oct. 27, 1936 |
| 2,214,511 | Schnitger | Sept. 10, 1940 |
| 2,349,715 | Francis | May 23, 1944 |
| 2,352,377 | Francis | June 27, 1944 |